United States Patent
Chhabra et al.

(10) Patent No.: US 10,691,190 B2
(45) Date of Patent: Jun. 23, 2020

(54) POWER DELIVERY NETWORK ANALYSIS OF MEMORY UNIT I/O POWER DOMAIN

(71) Applicant: Seagate Technology LLC, Cupertino, CA (US)

(72) Inventors: Nitin Kumar Chhabra, Pune (IN); Pritesh Mahadev Pawaskar, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 389 days.

(21) Appl. No.: 15/633,026

(22) Filed: Jun. 26, 2017

(65) Prior Publication Data

US 2018/0373302 A1 Dec. 27, 2018

(51) Int. Cl.
| | |
|---|---|
| *G06F 1/3203* | (2019.01) |
| *G06F 30/367* | (2020.01) |
| *G06F 1/3206* | (2019.01) |
| *G06F 1/26* | (2006.01) |
| *G06F 30/20* | (2020.01) |
| *G06F 119/06* | (2020.01) |

(52) U.S. Cl.
CPC .......... *G06F 1/3203* (2013.01); *G06F 30/367* (2020.01); *G06F 1/26* (2013.01); *G06F 1/3206* (2013.01); *G06F 30/20* (2020.01); *G06F 2119/06* (2020.01)

(58) Field of Classification Search
CPC .... G06F 17/5036; G06F 17/50; G06F 1/3203; G06F 1/26; G06F 17/5009
USPC ..................................................... 703/18, 13
See application file for complete search history.

(56) References Cited

U.S. PATENT DOCUMENTS

| | | | |
|---|---|---|---|
| 6,370,678 B1 * | 4/2002 | Culler ................. | G06F 17/5036 703/18 |
| 7,051,300 B1 | 5/2006 | Shen et al. | |
| 8,452,582 B1 * | 5/2013 | Al-Hawari ......... | G06F 17/5036 703/13 |
| 8,667,455 B1 | 3/2014 | Ho | |
| 9,286,430 B1 | 3/2016 | Ho | |
| 2012/0221312 A1 | 8/2012 | Dai et al. | |
| 2012/0221988 A1 | 8/2012 | Dai et al. | |
| 2012/0221990 A1 | 8/2012 | Dai et al. | |
| 2013/0191054 A1 | 7/2013 | Cho et al. | |

(Continued)

OTHER PUBLICATIONS

Su, Lei et al. "The High Speed Low Noise Multi-Data Processing Signal Process Circuit Research of Remote Sensing", Aug. 21, 2013, International Symposium on Photoelectronic Detection and Imaging, Imaging Sensors and Applications, SPIE. (Year: 2013).*

*Primary Examiner* — Cedric Johnson
(74) *Attorney, Agent, or Firm* — Holzer Patel Drennan

(57) ABSTRACT

The disclosed technology provides methods for performing a power delivery network analysis of the memory unit I/O power domain. The methods include performing a signal and power integrity analysis for a memory unit I/O power domain to extract characteristics of a current waveform, determining characteristics of an expected waveform based on a current response for the memory unit I/O power domain, and determining whether the characteristics of the current waveform and the characteristics of the expected waveform are within a tolerance limit. The method also includes various remedial operations and CPM regeneration which may iteratively occur until the waveform matches and final CPM is generated which is use for PDN analysis.

17 Claims, 4 Drawing Sheets

(56) References Cited

U.S. PATENT DOCUMENTS

2014/0131867 A1    5/2014   Jeong et al.
2014/0222360 A1    8/2014   Lim et al.

\* cited by examiner

POWER DELIVERY NETWORK ANALYSIS OF MEMORY UNIT I/O POWER DOMAIN

SUMMARY

In one implementation, the disclosed technology provides for a method that entails performing a power delivery network analysis of the memory unit I/O power domain. The methods include performing a signal and power integrity analysis for a memory unit I/O power domain to extract characteristics of a current waveform, determining characteristics of an expected waveform based on a current response for the memory unit I/O power domain, and determining whether the characteristics of the current waveform and the characteristics of the expected waveform are within a tolerance limit. The method also includes various remedial operations and CPM regeneration which may iteratively occur until the waveform matches and final CPM is generated which is used for PDN analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

DETAILED DESCRIPTION

The disclosed technology includes methods and systems for power delivery network (PDN) analysis for a memory unit (e.g., DDR/Flash) input/output (I/O) power domain. A PDN includes interconnects from a voltage regulator module (VRM) to pads on an integrated circuit or "chip," and the metallization on the die that locally distributes power and return current. The goal of the PDN is to provide signal integrity and power integrity on the chip.

Signal integrity analysis of a chip measures quality of an electrical signal (including for example, rise and fall of electrical signal) at various points in the chip whereas power integrity analysis of a chip measures whether desired voltage and current are met at various points in the chip. Thus, the signal and power integrity analysis of a chip for an I/O power domain of a memory unit includes measures quality and desired levels of an electrical signal at I/O of the chip.

An Application Specific Integrated circuit (ASIC) or System on Chip (SoC) needs clean power to meet their maximum performance. A PDN has an impedance ($Z_{PDN}$) associated with the path from the VRM to the SoC. The magnitude of noise (voltage ripple) on a power rail is proportional to the impedance ($Z_{PDN}$) and the transient current ($I_{TRANSIENT}$) draw associated with that rail. Based on Ohms law, $V_{RIPPLE}=I_{TRANSIENT} \times Z_{PDN}$.

The disclosed technology includes generating a current chip power model (CPM) for the DDR/Flash I/O (analog) power domain of the chip and performing a PDN analysis. In some implementations, the CPM includes a look-up table, which includes impedance and a current peak profile at different intervals and interfaces in the chip.

Figure 1:
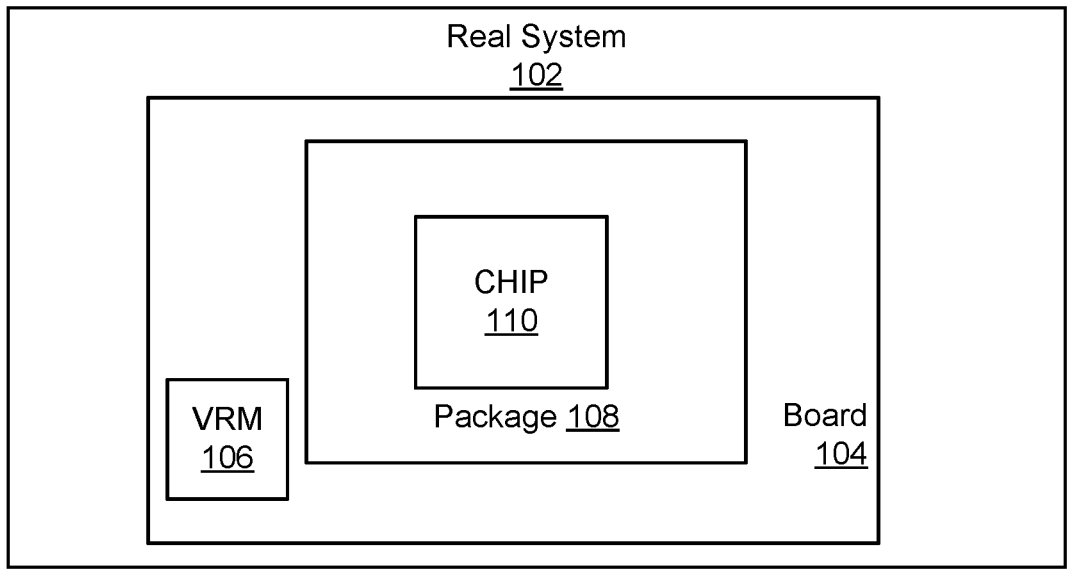
FIG. 1 is a block diagram of a computer system for power delivery network (PDN) analysis.
Figure 1:
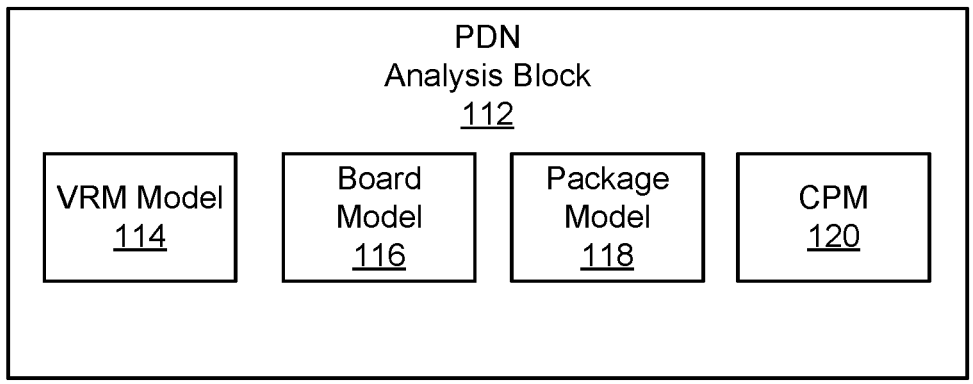
Figure 1:
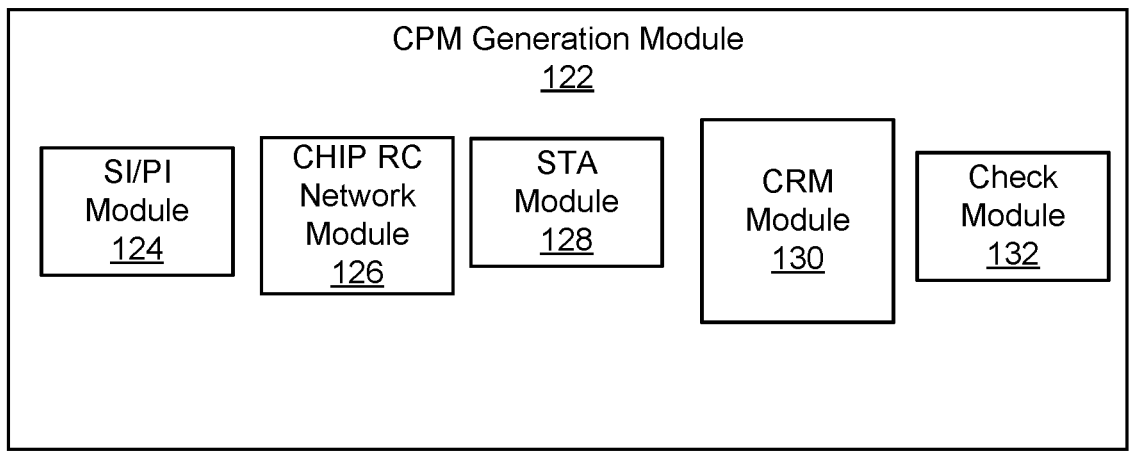

FIG. 1 is a block diagram of a computer system 100 for a memory unit (e.g., DDR/Flash) memory interface. A controller (not shown) in the computer system 100 is configured to perform a power delivery network analysis of the memory unit I/O power domain. The computer system 100 includes a real system 102, a PDN analysis block 112 and a CPM generation module 122. The real system 102 includes a board 104, a voltage regulator module (VRM) 106, a package 108 and a SoC (System on a chip or "chip") 110. The PDN analysis block 112 includes a VRM model 114, a board model 116, a package model 118 and a CPM 120. A CPM generation module 122 includes a signal integrity power integrity (SI/PI) module 124, a chip resistor-capacitor (RC) network module 126, a Static Timing Analysis (STA) module 128, a current response model (CRM) module 130, and a check module 132.

The VRM 106 is mounted on the board 104 in a real system 102. The VRM 106 provides power to DDR/Flash I/Os inside the chip 110 through the board 104 and the package 108.

To ensure sufficient power reaches a memory unit I/O domain, a good Power Delivery Network (PDN) is required, which is achieved in a design phase by the PDN analysis block 112. Models of corresponding physical components are needed for PDN analysis. The VRM model 114, board model 116, and package model 118 are generated by an external 3D Electromagnetic solver (not shown).

The CPM generation module 122 is used to generate the CPM 120. The CPM generation module 122 includes an SI/PI module 124, a chip RC network module 126, an STA module 128, a CRM 130 and a check module 132.

The SI/PI module 124 performs signal integrity and power integrity analysis in the analog domain for all I/O interfaces in a chip (e.g., DDR, flash, etc.) and determines a current waveform for the current response of CPM 120.

The CRM 130 is used to generate the current response of a DDR/FLASH I/O use inside the chip. Using a datasheet of the corresponding I/O, a piece wise linear (PWL) model of current waveform is generated and characterized over various voltages by spice simulations.

An initial CPM of the chip 110 is generated using the chip RC Network module 126, the STA module 128 and the CRM 130. The initial CPM of the chip 110 includes an expected waveform.

The check module 132 determines whether the expected waveform of the generated CPM matches the current waveform from a SI/PI module 124 within a tolerance limit or predetermined threshold (e.g., of 2% or 98% matching). If the two waveforms match within a tolerance limit then a final CPM is generated, and used for the PDN analysis block 112.

If the two waveforms do not match, then various remedial operations may iteratively occur until the waveform matches within the tolerance limit.

Determining whether the waveforms match includes comparing the areas and peaks of the waveform generated in an initial chip power model and the current waveform to see if the areas and peaks fall within a certain acceptable range. In some implementations, an acceptable range may be approximately within 2%.

In some implementations, if the areas of the waveforms match and the peak profiles do not match, then timing parameters of the STA module 128 need to be changed. If the expected waveform is more, an overlap time is reduced.

In some implementations, if the areas of the waveforms do not match and the peak profiles match, then activity factors of the STA module 128 need to be changed. If the expected waveform area is more, then an activity factor is reduced.

In some implementations, if the areas of the waveforms do not match and the peak profiles do not match, then timing parameters and activity factors of the STA module 128 need to be changed. To increase an area in the expected waveform, the activity factor is increased. To increase an expected waveform peak, the overlap time in STA module is increased.

The check module 132 includes software, and may be implemented in any tangible computer-readable storage media. As used herein, the term "tangible computer-readable storage media" includes, but is not limited to, RAM, ReRAM, MRAM, flash memory or other memory technology, and other solid state storage class memory or other optical disk storage, magnetic cassettes, magnetic tape, magnetic disk storage or other magnetic storage devices, or any other tangible medium which can be used to store the desired information and which can be accessed by a mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 2:
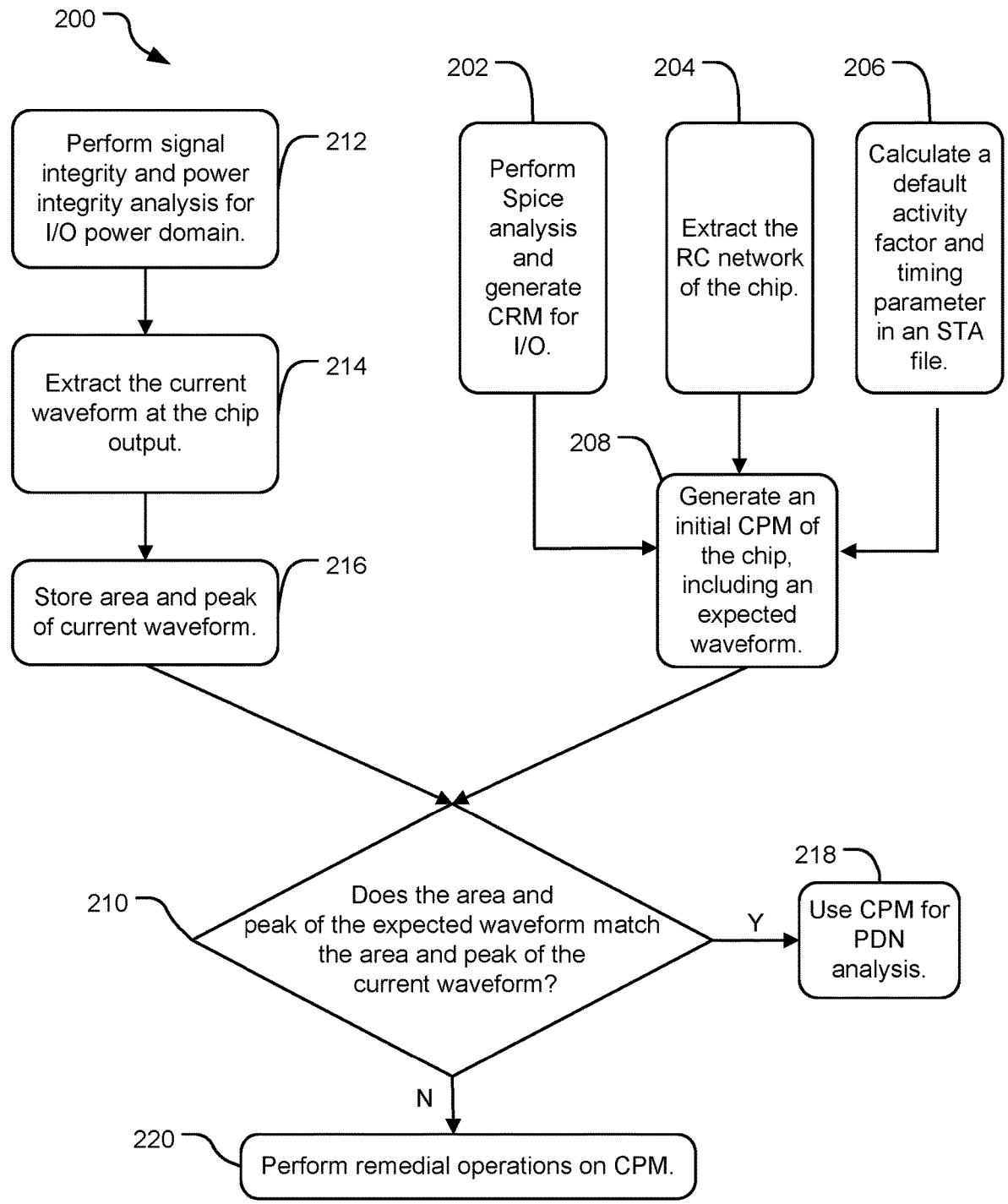
FIG. 2 is a flowchart of example operations for an initial CPM generation of an I/O power domain.

FIG. 2 is a flowchart of example operations 200 for initial CPM generation of memory unit I/O power domain in a chip (e.g., DDR, flash, etc.). A controller in a computer system may be configured to perform the operations 200. An operation 202 performs spice analysis in the analog domain for all memory unit I/O use inside the chip and generates a piece wise linear (PWL) current response model (CRM) of each I/O using datasheet and characterizes the PWL response across various voltages.

An operation 204 extracts the passive resistor-capacitor (RC) network of the chip. An operation 206 takes the default activity factor (e.g., 20%) and timing parameters embedded in the STA file. Operations 202, 204, and 206 may occur simultaneously or in different order.

An operation 208 generates an initial CPM of the chip using the CRM generated from operation 202, the RC network extracted in operation 204, and the default STA file calculated in operation 206. The initial CPM of the chip includes an expected waveform.

While operations 202, 204, 206, and 208 are occurring, operations 212, 214, and 216 may be occurring. An operation 212 performs signal integrity and power integrity analysis for the memory unit (e.g., DDR/Flash) I/O power domain. An operation 214 extracts the current waveform at the chip input. An operation 216 stores the area ($A_{SIPI}$) and the peak ($P_{SIPI}$) of the current waveform.

An operation 210 determines whether an area ($A_{CPM}$) and a peak ($P_{CPM}$) of the expected waveform generated in operation 208 matches the area ($A_{SIPI}$) and the peak ($P_{SIPI}$) of the current waveform derived from SI/PI simulation in operation 216. If the areas and the peaks match within a tolerance limit (e.g., of 2%), an operation 218 uses the CPM generated in operation 208 as the final CPM for PDN analysis.

If either the areas or the peaks do not match within the tolerance limit (e.g., of 2%), then various remedial operations 220 may iteratively occur until the two waveforms (of the CPM expected waveform generated in operation 208 and of the current waveform derived from SI/PI simulation in operation 216) matches within the tolerance limit of 2%.

Figure 3:
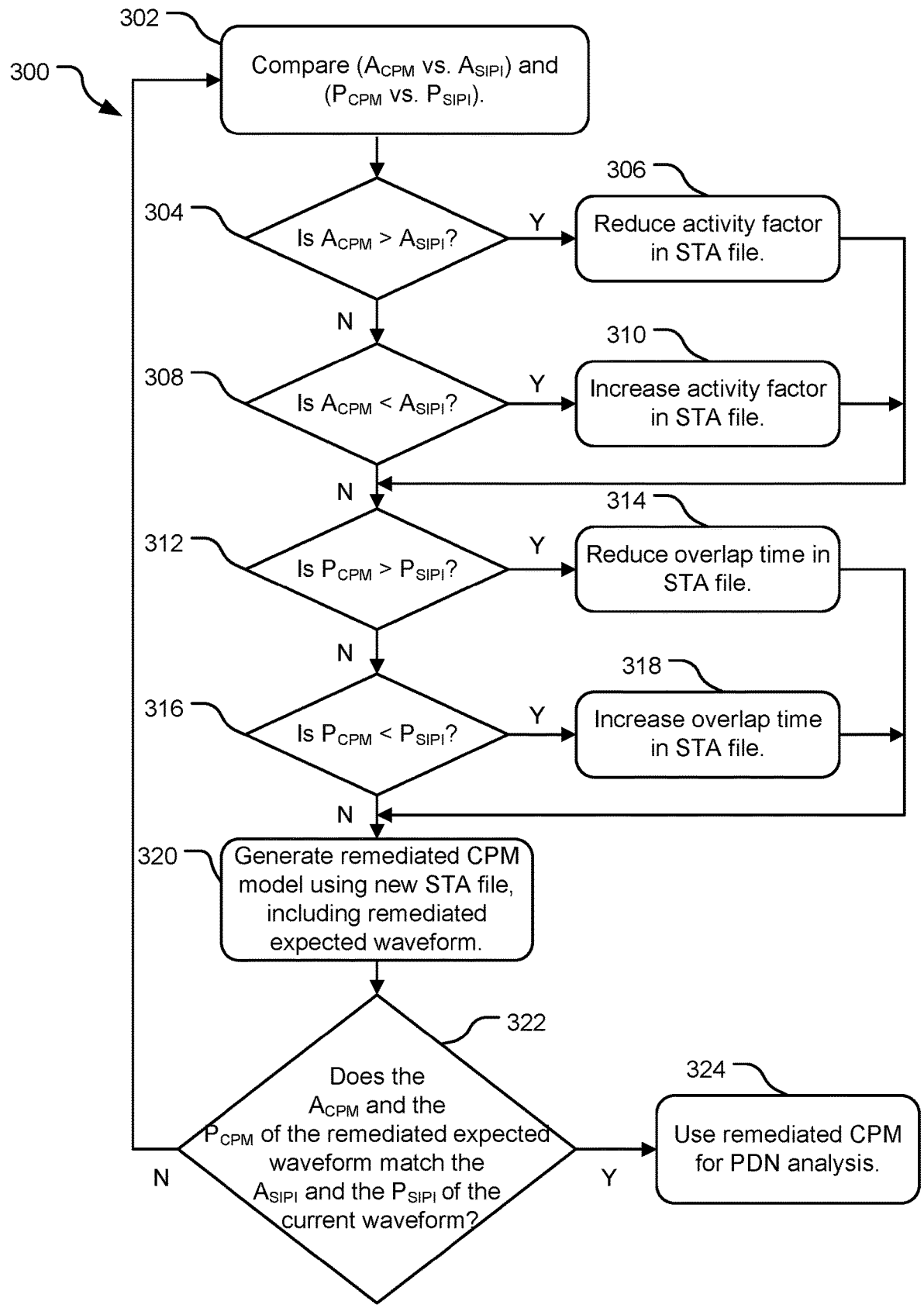
FIG. 3 is a flowchart of example operations for a final CPM generation with remedial operations.

FIG. 3 illustrates example operations 300 for final CPM generation of the I/O power domain with remedial operations. An operation 302 checks that remedial operations are needed for a remediated CPM. The operation 302 also computes the quantitative difference between an area ($A_{CPM}$) and a peak ($P_{CPM}$) of the CPM expected waveform and an area ($A_{SIPI}$) and a peak ($P_{SIPI}$) of the current waveform derived from SI/PI simulation.

An operation 304 determines whether the $A_{CPM}$ is greater than the $A_{SIPI}$. If the $A_{CPM}$ is greater than the $A_{SIPI}$, an activity factor in an STA file is reduced (e.g., by 2%) in an operation 306 and an operation 312 occurs. An operation 312 determines whether ($P_{CPM}$) is greater than ($P_{SIPI}$).

If an $A_{CPM}$ is not greater than an $A_{SIPI}$ then an operation 308 occurs. An operation 308 determines whether the $A_{CPM}$ is less than the $A_{SIPI}$. If the $A_{CPM}$ is less than the $A_{SIPI}$ an activity factor in the STA file is increased by 2% in an operation 310 and the operation 312 occurs.

During operation 312, if the $P_{CPM}$ is determined to be greater than the $P_{SIPI}$, then an overlap timing in the STA file is reduced (e.g., by 2%) in an operation 314, and an operation 320 occurs. An operation 320 generates a remediated CPM of the chip.

If the $P_{CPM}$ is not greater than the $P_{SIPI}$, then an operation 316 occurs. An operation 316 determines whether the $P_{CPM}$ is less than the $P_{SIPI}$. If the $P_{CPM}$ is less than the $P_{SIPI}$, then the overlap timing in the STA file is increased (e.g., by 2%) in an operation 314, and the operation 320 occurs.

The operation 320 generates a remediated CPM of the chip using the CRM model (described in FIG. 2, 202), the RC network (described in FIG. 2, 204) and modified STA file (described in operations 306/310/314/318).

An operation 322 determines whether the $A_{CPM}$ and the $P_{CPM}$ of the CPM expected waveform matches the $A_{SIPI}$ and the $P_{SIPI}$ of the current waveform derived from SI/PI simulation.

If the areas and the peaks match within the tolerance limit (e.g., of 2%), the remediated CPM generated is the final CPM and may be used for PDN analysis in an operation 324.

If either the areas or the peaks do not match within the tolerance limit (e.g., of 2%), then various remedial operations 302-320 may iteratively occur until the two waveforms match within the tolerance limit (e.g., of 2%), as determined in operation 322.

Figure 4:
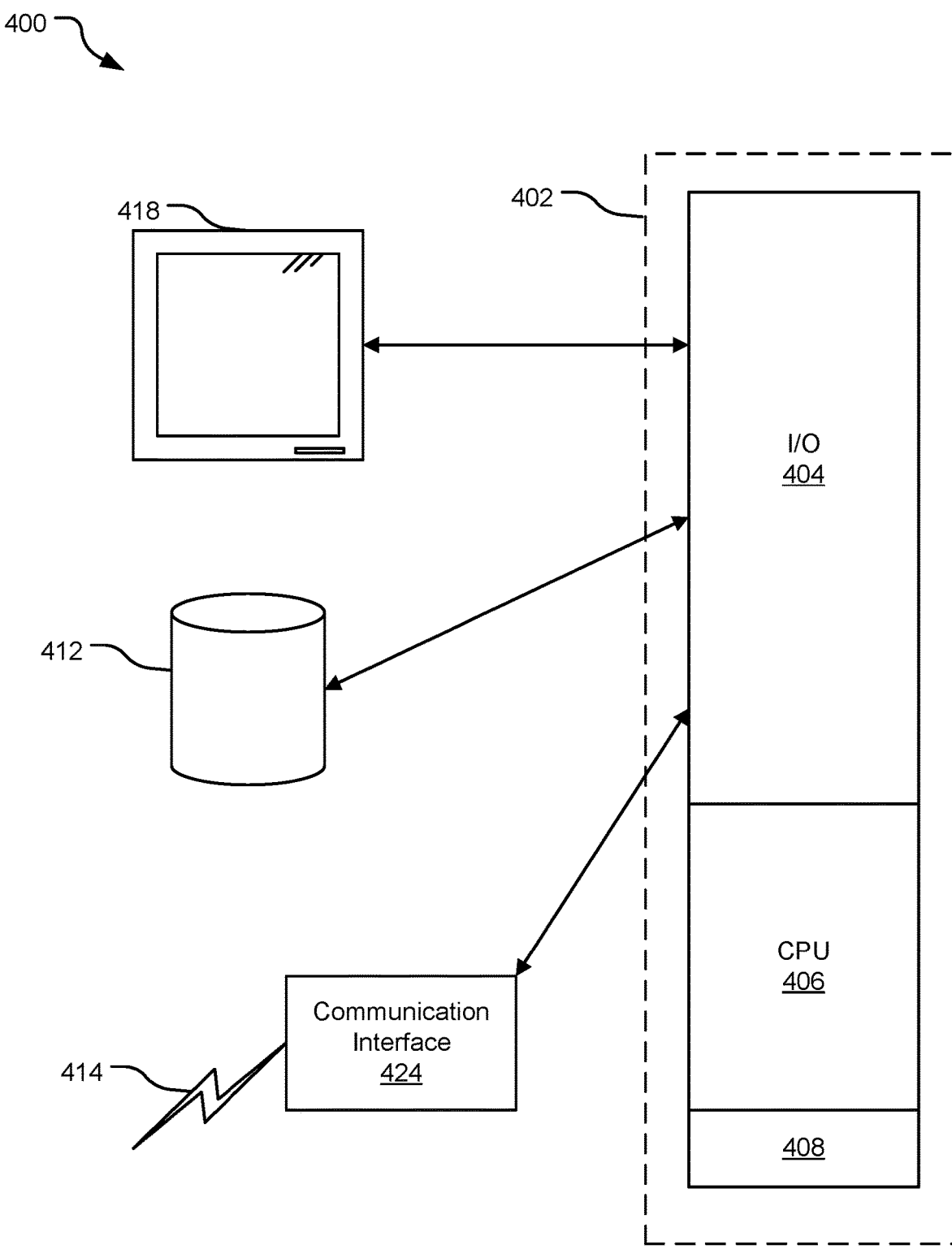
FIG. 4 is a block diagram of a computer system for PDN analysis.

Referring to FIG. 4, a block diagram of a computer system 400 suitable for implementing one or more aspects of a PDN system is shown. The computer system 400 is capable of executing a computer program product embodied in a tangible computer-readable storage medium to execute a computer process. Data and program files may be input to the computer system 400, which reads the files and executes the programs therein using one or more processors. Some of the elements of a computer system 400 are shown in FIG. 14 wherein a processor 402 is shown having an input/output (I/O) section 404, a Central Processing Unit (CPU) 406, and a memory section 408. There may be one or more processors 402, such that the processor 402 of the computing system 400 comprises a single central-processing unit 406, or a plurality of processing units. The processors may be single core or multi-core processors. The computing system 400 may be a conventional computer, a distributed computer, or any other type of computer. The described technology is optionally implemented in software loaded in memory 408, a disc storage unit 412, and/or communicated via a wired or wireless network link 414 on a carrier signal (e.g., Ethernet, 3G wireless, 5G wireless, LTE (Long Term Evolution)) thereby transforming the computing system 400 in FIG. 4 to a special purpose machine for implementing the described operations.

The I/O section 404 may be connected to one or more user-interface devices (e.g., a keyboard, a touch-screen display unit 418, etc.) or a disc storage unit 412. Computer program products containing mechanisms to effectuate the systems and methods in accordance with the described technology may reside in the memory section 404 or on the storage unit 412 of such a system 400.

A communication interface 424 is capable of connecting the computer system 400 to an enterprise network via the network link 414, through which the computer system can receive instructions and data embodied in a carrier wave. When used in a local area networking (LAN) environment, the computing system 400 is connected (by wired connection or wirelessly) to a local network through the communication interface 424, which is one type of communications device. When used in a wide-area-networking (WAN) environment, the computing system 400 typically includes a modem, a network adapter, or any other type of communications device for establishing communications over the wide area network. In a networked environment, program modules depicted relative to the computing system 400 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory 408 and/or the storage unit 412 and executed by the processor 402. Further, local computing systems, remote data sources and/or services, and other associated logic represent firmware, hardware, and/or software, which may be configured to assist in obtaining PDN analysis. A PDN analysis system may be implemented using a general purpose computer and specialized software (such as a server executing service software to a workstation or client), a special purpose computing system and specialized software (such as a mobile device or network appliance executing service software), or other computing configurations. In addition, PDN analysis may be stored in the memory 408 and/or the storage unit 412 and executed by the processor 402.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage device controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   performing a signal and power integrity analysis for a memory unit I/O power domain of a system on a chip to extract characteristics of a current waveform at an input of the chip;
   determining characteristics of an expected waveform based on a current response of a current chip power mode (CPM) for the memory unit I/O power domain;
   determining whether the characteristics of the current waveform and the characteristics of the expected waveform are within a tolerance limit; and
   generating the CPM by performing a spice analysis to generate the current response for the memory unit I/O power domain, extracting a resistor-capacitor network of the chip, and calculating a default activity factor and timing parameter in a static timing analysis (STA) file.

2. The method of claim 1, further comprising:
   generating a final CPM for power delivery network analysis based on determining that the characteristics of the current waveform and the characteristics of the expected waveform are within a tolerance limit.

3. The method of claim 1, further comprising:
   iteratively performing remedial operations based on determining that the characteristics of the current waveform and the characteristics of the expected waveform are not within a tolerance limit.

4. The method of claim 3, wherein the characteristics of a waveform include a peak of a waveform and an area of the waveform.

5. The method of claim 4, further comprising reducing an activity factor in the STA file based on determining that the area of the expected waveform is greater than the area of the current waveform.

6. The method of claim 4, further comprising increasing an activity factor in the STA file based on determining that the area of the expected waveform is less than the area of the current waveform.

7. The method of claim 4, further comprising reducing an overlap time in the STA file based on determining that the peak of the expected waveform is greater than the peak of the current waveform.

8. The method of claim 4, further comprising increasing an overlap time in the STA file based on determining that the peak of the expected waveform is less than the peak of the current waveform.

9. A storage device comprising:
a memory configured to store waveforms; and
a storage device controller executed by a processor connected to the memory, the storage device controller configured to:
perform a signal and power integrity analysis for a memory unit I/O power domain of a system on a chip to extract characteristics of a current waveform at an input of the chip;
determine characteristics of an expected waveform based on a current response of a current chip power model (CPM) for the memory unit I/O power domain;
determine whether the characteristics of the current waveform and the characteristics of the expected waveform are within a tolerance limit; and
generate the CPM by performing a spice analysis to generate the current response for the memory unit I/O power domain, extracting a resistor-capacitor network of the chip, and calculating a default activity factor and timing parameter in a static timing analysis file.

10. The storage device of claim 9, wherein the storage device controller is further configured to:
generate a final CPM for power delivery network analysis based on determining that the characteristics of the current waveform and the characteristics of the expected waveform are within a tolerance limit.

11. The storage device of claim 9, wherein the storage device controller is further configured to:
iteratively perform remedial operations based on determining that the characteristics of the current waveform and the characteristics of the expected waveform are not within a tolerance limit.

12. The storage device of claim 9, wherein the characteristics of a waveform include a peak of a waveform and an area of the waveform.

13. One or more tangible computer-readable storage memories encoding computer-executable instructions for executing on a computer system a computer process, the computer process comprising:
performing a signal and power integrity analysis for a memory unit I/O power domain of a system on a chip to extract characteristics of a current waveform at an input of the chip;
determining characteristics of an expected waveform based on a current response of a current chip power model (CPM) for the memory unit I/O power domain;
determining whether the characteristics of the current waveform and the characteristics of the expected waveform are within a tolerance limit; and
generating the CPM by performing a spice analysis to generate the current response for the memory unit I/O power domain, extracting a resistor-capacitor network of the chip, and calculating a default activity factor and timing parameter in a static timing analysis (STA) file.

14. The one or more tangible computer-readable storage memories of claim 13, further comprising:
generating a final CPM for power delivery network analysis based on determining that the characteristics of the current waveform and the characteristics of the expected waveform are within a tolerance limit.

15. The one or more tangible computer-readable storage memories of claim 13, further comprising:
iteratively performing remedial operations based on determining that the characteristics of the current waveform and the characteristics of the expected waveform are not within a tolerance limit.

16. The one or more tangible computer-readable storage memories of claim 15, wherein the characteristics of a waveform include a peak of a waveform and an area of the waveform.

17. The one or more tangible computer-readable storage memories of claim 16, further comprising:
further comprising reducing an activity factor in the STA file based on determining that the area of the expected waveform is greater than the area of the current waveform.

* * * * *